United States Patent
Kimura et al.

(10) Patent No.: US 9,784,895 B2
(45) Date of Patent: Oct. 10, 2017

(54) COLORED LOW-POLARIZING FILMS, COLORED LOW-POLARIZING SHEETS, AND COLORED LOW-POLARIZING LENSES, AND METHODS THEREOF

(71) Applicants: MITSUBISHI GAS CHEMICAL COMPANY, INC., Tokyo (JP); MGC FILSHEET CO., LTD., Saitama (JP)

(72) Inventors: Hideaki Kimura, Saitama (JP); Taisuke Sasagawa, Saitama (JP); Masayuki Akaki, Saitama (JP); Toshihiko Takano, Saitama (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 0 days.

(21) Appl. No.: 14/762,291

(22) PCT Filed: Jan. 21, 2014

(86) PCT No.: PCT/JP2014/051066
§ 371 (c)(1),
(2) Date: Jul. 21, 2015

(87) PCT Pub. No.: WO2014/115705
PCT Pub. Date: Jul. 31, 2014

(65) Prior Publication Data
US 2015/0355395 A1 Dec. 10, 2015

(30) Foreign Application Priority Data

Jan. 25, 2013 (JP) .................... 2013-012285
Nov. 29, 2013 (JP) .................... 2013-247485
Nov. 29, 2013 (JP) .................... 2013-247489

(51) Int. Cl.
| G02B 5/30 | (2006.01) |
| B29D 11/00 | (2006.01) |
| G02C 7/10 | (2006.01) |
| G02C 7/12 | (2006.01) |
| G02B 5/22 | (2006.01) |
| B29K 29/00 | (2006.01) |

(52) U.S. Cl.
CPC ........ G02B 5/305 (2013.01); B29D 11/00644 (2013.01); G02B 5/223 (2013.01); G02B 5/3033 (2013.01); G02C 7/10 (2013.01); G02C 7/12 (2013.01); *B29K 2029/04* (2013.01)

(58) Field of Classification Search
CPC ........ G02B 1/041; G02B 1/08; G02B 5/3025; G02B 5/305; G02C 7/12; G02C 7/022; G02C 7/024; G02C 7/10; G02C 7/104; G02C 7/105; G02C 7/108; G02C 2202/16; B29D 11/00644; B29K 2029/04

USPC ........................ 359/487.02, 487.05
See application file for complete search history.

(56) References Cited

U.S. PATENT DOCUMENTS

| 4,859,039 | A | * | 8/1989 | Okumura | ............... G02B 5/205 359/487.02 |
| 5,751,481 | A | * | 5/1998 | Dalzell | ................. B29C 51/428 264/1.32 |
| 5,751,483 | A | | 5/1998 | Itoh et al. | |
| 2003/0063255 | A1 | * | 4/2003 | Moravec | ............... G02B 1/041 351/159.27 |
| 2008/0038544 | A1 | * | 2/2008 | Kitaike | ............ B29C 45/14811 428/336 |
| 2009/0051058 | A1 | | 2/2009 | Ogomi | |
| 2009/0174942 | A1 | * | 7/2009 | Sadamitsu | ............ C09B 31/072 359/487.02 |
| 2012/0206689 | A1 | | 8/2012 | Ohkubo | |
| 2013/0070196 | A1 | | 3/2013 | Tokumaru | |
| 2013/0314786 | A1 | * | 11/2013 | Higeta | ..................... G02B 1/04 359/487.02 |

FOREIGN PATENT DOCUMENTS

| CN | 101371172 | 2/2009 |
| EP | 2 889 655 | 7/2015 |
| JP | 3-39903 | 2/1991 |
| JP | 6-242318 | 9/1994 |
| JP | 8-52817 | 2/1996 |
| JP | 8-313701 | 11/1996 |
| JP | 9-5683 | 1/1997 |
| JP | 2008-165200 | 7/2008 |
| WO | 2011/049108 | 4/2011 |
| WO | 2011/155550 | 12/2011 |

OTHER PUBLICATIONS

Search report from PCT/JP2014/051066, mail date is Apr. 22, 2014.
Extended European Search Report issued in Patent Application No. 14743683.6, dated Sep. 12, 2016.

* cited by examiner

*Primary Examiner* — Frank Font
(74) *Attorney, Agent, or Firm* — Greenblum & Bernstein, P.L.C.

(57) ABSTRACT

A colored low-polarizing film of a desired color is produced by causing a polyvinyl alcohol film to swell with water, stretching, dyeing with an organic dichroic dye, and drying it; a polarizing sheet including the film and transparent sheets attached to both sides of the film by an adhesive; and an injection-molded polarizing lens obtained by causing the sheet to curve to impart spherical or aspherical surfaces to obtain a curved polarizing lens and injecting a transparent resin onto the concave surface of the lens. The dye includes a dichroic organic dye and a coloration organic dye, wherein the dichroic composition includes a combination of dichroic dyes having a dichroic ratio of 13 or higher, wherein the coloration dye composition includes a combination of dyes having an extremely low dichroic ratio, of 4 or less, or substantially having no dichroic ratio.

21 Claims, No Drawings

COLORED LOW-POLARIZING FILMS, COLORED LOW-POLARIZING SHEETS, AND COLORED LOW-POLARIZING LENSES, AND METHODS THEREOF

TECHNICAL FIELD

The present invention relates to a low-polarizing film that shows a desired total light transmittance and a desired low degree of polarization when it is used in sunglasses. The polarizing film also shows little change in color tone and transmittance and its color tone can be more flexibly selected. The present invention also relates to a low-polarizing sheet, a low-polarizing lens, and a method for producing them.

BACKGROUND

To make a polarizing sheet, generally a polarizing film that is obtained by absorbing or impregnating iodine or dichroic dyes in a monoaxially starched polyvinyl alcohol (PVA) film is used (hereafter, "PVA polarizing film"). Generally, transparent resins, such as triacetylcellulose, are used on one or both sides of the polarizing film as a protective layer or layers to make a polarizing plate. Such a polarizing plate is easily handled and is useful for secondary processing. Further, it is cheap and light.

The polarizing sheet is obtained by affixing a transparent resin sheet as a protective layer on both sides of a polarizing film (hereafter, a "polarizing sheet"). Generally, the film is a stretched polyvinyl alcohol film dyed with dichroic dyes. The polarizing sheet, which is obtained by a curving process, an injection process, or both, is used in polarizing lenses for sunglasses or goggles. Depending on the properties of the resin, for example, if the resin is an aromatic polycarbonate, the sunglasses or the goggles have superior impact resistance, as well as high heat resistance. If the resin is a polyamide, since it has superior stainability, one can obtain sunglasses or goggles that require various design characteristics.

For sunglasses and goggles that require impact resistance and heat resistance, the aromatic polycarbonate that is derived from bisphenol A is suitably used. However, since the aromatic polycarbonate has a large photoelastic constant, if the aromatic polycarbonate is curved to make a spherical or aspherical surface, such as in sunglasses or goggles, colored interference fringes easily arise by the retardation of the polycarbonate. As a result, the interference fringes cause problems such as deterioration in the appearance of articles and eyestrain.

Further, in a polarizing lens obtained by causing a polarizing sheet that uses an aromatic polycarbonate as a transparent sheet to curve to make spherical or aspherical surfaces, because of the uneven thickness of the aromatic polycarbonate polarizing sheet, distortion of images occurs. Therefore, the polarizing lens has problems in terms of causing deterioration in appearance (of articles) and eyestrain.

Regarding retardation that arises during the curving processes, an aromatic polycarbonate sheet that is used as a protective layer subjected to pre-extruding to make a large retardation to have colored interference fringes become invisible (hereafter, a "stretched polycarbonate polarizing sheet") was known (Reference 1). Among various polarizing sheets, this sheet is used for articles that require an excellent appearance or that need to be beneficial to one's vision.

Further, for improving the function of a polarizing lens that is obtained by causing a polarizing sheet to curve, a polarizing lens that is obtained by causing a polarizing sheet to curve to form a spherical or aspherical surface, inserting the curved polarizing sheet into a mold, and injecting a transparent resin in the mold to produce the lens (hereafter, an "injection polarizing lens"), is known. A polarizing lens that uses an aromatic polycarbonate as a resin is also known (hereafter, "aromatic polycarbonate polarizing lens") (References 2 and 3).

The aromatic polycarbonate polarizing lens is made by injecting an aromatic polycarbonate into a mold to fill the aromatic polycarbonate in the concave surface of the curved aromatic polycarbonate sheet. This brings about a benefit where the uneven thickness of the stretched polycarbonate sheet that is inserted in the mold disappears. Thus, even for lenses without focus refractivity, they are used in products that require particularly excellent impact resistance or appearance or that need to be beneficial to one's vision.

In lenses such as aromatic polycarbonate polarizing lenses that are obtained by inserting thermosetting resins or thermoplastic resins into molds, the shape and thickness of the molded lenses can be freely set by accordingly setting the shape of the surface of both sides of the mold and the distance between the two sides. Thus, based on the optical design, the shape and the distance between the two sides of the mold can be set so as to have the desired values of focus refractivity, prism-diopter, and image distortion.

The surface shape of the molded lens and the surface shape of the mold at the time of contact with the molded lens are generally identical. However, if a very high level of precision of the surface shape of the lens is required to compensate for a reduction in the thickness of the lens or a change in the surface shape, which are caused by shrinking of the volume when thermosetting resins or thermoplastic resins that are injected into molds solidify, the surface shape and the distance between the two sides of the mold should be adjusted accordingly.

The surface of the injection polarizing lens that is produced in this way is subject to further appropriate steps, such as forming a hard coat layer or an anti-reflection film, etc., and then polishing the rims of the lenses, drilling, screw fastening, etc., to fix the lens to the frame, thereby making sunglasses and goggles.

In the polarizing lens obtained by applying curving processes to the polarizing sheet to form a spherical or aspherical surface or the injection polarizing lens obtained by injecting an aromatic polycarbonate, etc., for the purpose of reducing the glare of the surface of the glass, the surface of water, etc., polarized light in the horizontal direction is cut. In addition, for the purpose of improving visibility or design, for example, an aromatic polycarbonate polarizing sheet colored grey, brown, or the like, is used to provide a desired color tone and transmittance.

To increase the degree of polarization of a polarizing lens, the amount of dichroic dye for dyeing a polyvinyl alcohol film is adjusted to a concentration at which the polarization component in the horizontal direction of light incident to the polarizing lens is almost all absorbed. And when the amount of the dichroic dye for dyeing the polyvinyl alcohol film is further increased, the polarization component in the perpendicular direction of light incident to the polarizing lens is also absorbed in a large amount. For a higher performing polarizing lens, a polarizing lens that shows decreased absorbance of the polarization component in the perpendicular direction of light incident in the polarizing lens, by using a dichroic dye that shows a higher dichroic ratio, is required.

Further, regarding the dichroic dyes for dyeing the polyvinyl alcohol film, not a single color, but dichroic dyes of several colors, are used. In this regard, by changing the amount of each dichroic dye for dyeing the polyvinyl alcohol film, a polarizing lens having a desired color tone and transmittance can be obtained. Further, a method to obtain a polarizing lens that has a color tone or transmittance of interest by dissolving the dyes in an adhesive layer or an aromatic polycarbonate sheet can be used. The method can control the color tone or the transmittance of an injection polarizing sheet by itself or in combination with the steps explained above.

Further, a method to obtain a polarizing lens that has a desired color tone or a desired transmittance by dissolving the dyes in an adhesive layer or an aromatic polycarbonate sheet can be used. The method can control the color tone or the transmittance of an injection polarizing sheet by itself or in combination with the steps explained above.

In a liquid crystalline material for a projection television that uses a polarizing film and color filters, a method was known for producing a color filter that has a polarizing function and a specific absorption function for absorbing wavelengths by using dichroic dyes and dyes that have low dichroic ratios. (Reference 4)

PRIOR-ART DOCUMENTS

Patent Documents

Patent Document 1: Japanese Laid-Open Patent Publication No. 1103-39903
Patent Document 2: Japanese Laid-Open Patent Publication No. 1108-52817
Patent Document 3: Japanese Laid-Open Patent Publication No. H08-313701
Patent Document 4: Japanese Laid-Open Patent Publication No. H06-242318

The problem to be solved of the present invention is providing a polarizing film for sunglasses that shows the desired total light transmittance and the desired degree of polarization and little changes in color tone or transmittance. The color of the polarizing film can be more freely selected than in the prior art.

Generally, a polarizing film that has a high total transmittance and a high degree of polarization is known as a sophisticated polarizing lens (hereafter, "high-transmittance and high-polarizing articles"). To produce such articles, it is necessary to use a combination of dyes that have high dichroic ratios and to keep the degradation of the dyes as small as possible. From this point, the use of such lenses that show a high transmittance and a high degree of polarization are limited to articles that do not have applied a heat-curving process that brings about a degradation of dyes or that have applied a two-dimensional curving or three-dimensional curving having a small curve.

Generally, PVA polarizing films that have a degree of polarization of 99% or more are industrially produced. Some PVA polarizing films for sunglasses generally show a total light transmittance of 30% or more and a degree of polarization of 99% or more. Generally, the total light transmittance is in the range of 10-25%.

Further, various colored articles are required. To provide such articles, a method for using various amounts of dichroic organic dyes to obtain polarizing lenses that have desired color tones and desired transmittances was used. In this method, depending on the dichroic organic dyes to be used, the scopes of the colors of the polarizing sheet are limited. Further, there is a problem in that color changes during processing steps, such as a curving process to make a spherical or aspherical surface and at an injection process for a transparent resin, to the concave surface of the curved sheet, are relatively large.

The inventors found in studies that under conditions in which a good injection polarizing lens can be obtained the color tone and transmittance of the injection polarizing lens are not substantially changed during the process for injecting a transparent resin to produce a polarizing lens. Thus, it was found that the color change occurs during the curving process to curve the polarizing sheet to form a spherical or aspherical surface.

In particular, there is a problem in that for a polarizing lens having a high dye concentration and a low transmittance, the color tone and transmittance of the polarizing sheet after molding are significantly changed compared to a polarizing lens having a low dye concentration and a high transmittance. In addition, there is a problem in that when there is a significant change between the color tone and transmittance before and after a curving process, the variations of the color tone and the transmittance of the finished products are not constant, resulting in differences between those molded products.

For the color filter in Reference 4, absorbing functions at specific wavelengths are given by using the filter to shade visible light. Thus, the filter is just used to absorb specific wavelengths in a specific amount and is not used to control transmittance or color tone. Thus, the problem described above does not need to be considered.

The explanations of the above paragraphs relate to articles that have a degree of polarization of 99% or more. There are sunglasses that are not called polarizing sunglasses, because of their low degree of polarization. Sunglasses that have a low degree of polarization and a low light transmittance are sold. A close look at such sunglasses, shows that they are produced by laminating a PVA polarizing film that has a low-polarizing degree and a high light transmittance and a colored film that has a specific range of a low light transmittance, to produce sunglasses that have the low-transmittance of interest. To carry out this method, a PVA polarizing film must be used with a color film that has the color and the transmittance of interest. By selecting the color and the transmittance of the color film, sunglasses that have a low light transmittance and the selected color can be produced.

Means for Solving the Problems

As a result of studies to solve the above problems i.e., obtaining a colored low-polarizing film that has a low total light transmittance and a low degree of polarization and that can use a wide range of color tones, the inventors found a method for producing colored low-polarizing films, for controlling the polarizing degree by using a dichroic organic dye composition that shows a high dichroic ratio and transmittance and the color tones, by using a coloration organic dye composition that shows an extremely low dichroic ratio or substantially has no dichroic ratio. From these findings the applicants accomplished the present invention.

Thus, the present invention is:

(1) a colored low-polarizing film produced by causing a polyvinyl alcohol film to swell with water, uniaxially stretching it, dyeing it with a dichroic organic dye, and drying it, wherein the dichroic organic dye comprises a dichroic organic dye composition and a coloration organic dye composition,
wherein the dichroic organic dye composition comprises a combination of dichroic organic dyes having a dichroic ratio of 13 or higher, used in an amount necessary to keep the polarizing degree from 30% to less than 90%, wherein the coloration organic dye composition comprises a combination of dyes having an extremely low dichroic ratio, of 4 or less, or substantially having no dichroic ratio, and
wherein the polarizing degree of the film is 45% to 90%.

Further, in the invention (1) the present invention relates to:
(2) a colored low-polarizing, wherein the dichroic organic dye composition is used in an amount necessary to obtain the lower limit of the required dichroic ratio, or;
(3) a colored low-polarizing, wherein the coloration organic dye composition is used in an amount such that the transmittance of the film is 8% to 50% and is at least 5% less than the transmittance of a polarizing film obtained by using the dichroic organic dye composition only.

Further, the present invention is also:
(4) a method for producing a colored low-polarizing film by causing a polyvinyl alcohol film to swell with water, uniaxially stretching it, dyeing it with a dichroic organic dye, and drying it,
wherein the dichroic organic dye comprises a dichroic organic dye composition and a coloration organic dye composition,
wherein the dichroic organic dye composition comprises a combination of dichroic organic dyes having a dichroic ratio of 13 or higher, used in an amount necessary to keep the polarizing degree from 30% to less than 90%, wherein the coloration organic dye composition comprises a combination of dyes having an extremely low dichroic ratio of 4 or less or substantially having no dichroic ratio,
wherein the polarizing degree of the film is 45% to 90%.

Further, in the invention (4) the present invention relates to:
(5) a method for producing a colored low-polarizing film, wherein the dichroic organic dye composition and the coloration organic dye composition are used in an aqueous solution,
(6) a method for producing a colored low-polarizing film, wherein the dichroic organic dye composition is used in an amount necessary to obtain the lower limit of the required dichroic ratio,
(7) a method for producing a colored low-polarizing film, wherein the coloration organic dye composition is used in an amount such that the transmittance of the film is 8% to 50% and is at least 5% less than the transmittance of a polarizing film obtained by using the dichroic organic dye composition only, or
(8) a method for producing a colored low-polarizing film, wherein the method comprises:
determining the objective values of the polarizing degree, the transmittance rate, and the color phase, of the colored low-polarizing film,
calculating the amounts of the dichroic organic dye composition and the coloration organic dye composition to be used to obtain the objective values without considering a color change brought about by a simultaneous dyeing of the dichroic organic dye composition and the coloration organic dye composition,
producing the film in the aqueous solution that contains the calculated amounts of the dichroic organic dye composition and the coloration organic dye composition,
comparing the values of the polarizing degree, the transmittance rate, and the color phase, of the produced film with the objective value,
dying the obtained film in an aqueous solution that contains the recalculated amounts of the dichroic organic dye composition and coloration organic dye composition so as to obtain the objective values, and
repeating the above steps until the colored low-polarizing film of a desired color that has the objective values is obtained.

Further, the present invention is also:
(9) a colored low-polarizing sheet that comprises a polarizing film produced by causing a polyvinyl alcohol film to swell with water, uniaxially stretching it, dyeing it with a dichroic organic dye, and drying it, and transparent sheets being attached on both sides of the polarizing film by an adhesive,
wherein the polarizing film is a colored low-polarizing film of a desired color that has a polarizing degree of 45% to 90%,
wherein the dichroic organic dye comprises a dichroic organic dye composition and a coloration organic dye composition,
wherein the dichroic organic dye composition comprises a combination of dichroic organic dyes having a dichroic ratio of 13 or higher, used in an amount necessary to keep the polarizing degree from 30% to less than 90%, wherein the coloration organic dye composition comprises a combination of dyes having an extremely low dichroic ratio, of 4 or less, or substantially having no dichroic ratio.

Further, in the invention (10) the present invention relates to:
(10) a colored low-polarizing sheet, wherein the dichroic organic dye composition and the coloration organic dye composition are used in an aqueous solution,
(11) a colored low-polarizing sheet, wherein the dichroic organic dye composition is used in an amount necessary to obtain the lower limit of the required dichroic ratio,
(12) a colored low-polarizing sheet, wherein the coloration organic dye composition is used in an amount such that the transmittance [of the film] is 8% to 50% and is at least 5% less than the transmittance of a polarizing film obtained by using the dichroic organic dye composition only,
(13) a colored low-polarizing sheet, wherein the resin of the transparent plastic sheet is one or more resins selected from the group consisting of: aromatic polycarbonates, polyacrylates, acetylcelluloses, and a composition of an aromatic polycarbonate and an alicyclic polyester,
(14) a colored low-polarizing sheet, wherein the transparent plastic sheet is an aromatic polycarbonate sheet and the polarizing sheet is from 0.1 mm to 1 mm thick at 3000 nm or higher double refraction,
(15) a colored low-polarizing sheet, wherein the adhesive agent in the adhesive layer is a two-liquid-type thermosetting polyurethane resin that consists of a curative agent that comprises a polyurethane prepolymer and a hydroxyl (poly) acrylate, or
(16) a colored low-polarizing sheet, wherein the colored low-polarizing film is obtained by:
determining the objective values of the polarizing degree, the transmittance rate, and the color phase, of the colored low-polarizing film of a desired color,
calculating the amounts of the dichroic organic dye composition and the coloration organic dye composition to be used to obtain the objective values without considering a color change brought about by a simultaneous dyeing of the dichroic organic dye composition and the coloration organic dye composition, producing the film in the aqueous solution that contains the calculated amounts of the dichroic organic dye composition and the coloration organic dye composition, comparing the values of the polarizing degree, the transmittance rate, and the color phase, of the produced film with the objective values, dying the obtained film in an aqueous solution that contains the recalculated amounts of the dichroic organic dye composition and coloration organic dye composition so as to obtain the objective values, and repeating the above steps until the colored low-polarizing film of a desired color that has the objective values is obtained.

The present invention is also:

(17) a colored low-polarizing lens obtained by:
laminating a transparent plastic sheet via an adhesive layer to each surface of a polarizing film that is made by causing a polyvinyl alcohol resin to swell with water, uniaxially stretching it, dyeing it with a dichroic organic dye, and drying it to obtain a polarizing sheet, causing the polarizing sheet to curve so as to impart spherical or aspherical surfaces thereto to obtain a curved polarizing lens or causing the polarizing sheet to curve so as to impart spherical or aspherical surfaces thereto and injecting a transparent resin onto the concave surface to obtain an injection-molded lens, wherein the transparent resin is an aromatic polycarbonate, wherein the surface of one side of the polarizing sheet is a colored low-polarizing sheet that has 45% to 90% of the polarizing degree and that side is curved to make a concave surface, wherein the dichroic organic dye comprises a dichroic organic dye composition and a coloration organic dye composition, wherein the dichroic organic dye composition comprises a combination of dichroic organic dyes having a dichroic ratio of 13 or higher, used in an amount to keep the polarizing degree from 30% to less than 90%, wherein the coloration organic dye composition comprises a combination of dyes having an extremely low dichroic ratio, of 4 or less, or substantially having no dichroic ratio.

Further, the present invention relates to:

(18) a colored low-polarizing lens, wherein the dichroic organic dye composition and the coloration organic dye composition are used in an aqueous solution,

(19) a colored low-polarizing lens, wherein the dichroic organic dye composition is used in an amount necessary to obtain the lower limit of the required dichroic ratio,

(20) a colored low-polarizing lens, wherein the coloration organic dye composition is used in an amount such that the transmittance of the film is 8% to 50% and is at least 5% less than the transmittance of a polarizing film obtained by using the dichroic organic dye composition only,

(21) a colored low-polarizing lens,
wherein the resin of the transparent plastic sheet is one or more selected from the group consisting of aromatic polycarbonates, polyacrylates, acetylcelluloses, and a composition of an aromatic polycarbonate and an alicyclic polyester,

(22) a colored low-polarizing lens, wherein the transparent plastic sheet is an aromatic polycarbonate sheet and the polarizing sheet is from 0.1 mm to 1 mm thick at 3000 nm or higher double refraction,

(23) a colored low-polarizing lens, wherein the adhesive agent in the adhesive layer is a two-liquid-type thermosetting polyurethane resin that consists of a curative agent that comprises a polyurethane prepolymer and a hydroxyl (poly) acrylate, or

(24) a colored low-polarizing lens, wherein a colored low-polarizing film of a desired color is obtained by:
determining the objective values of the polarizing degree, the transmittance rate, and the color phase, of the colored low-polarizing film of a desired color, calculating the amounts of the dichroic organic dye composition and the coloration organic dye composition to be used to obtain the objective values without a consideration of a color change brought about by a simultaneous dyeing of the dichroic organic dye composition and the coloration organic dye composition, producing the film in the aqueous solution that contains the calculated amounts of the dichroic organic dye composition and the coloration organic dye composition, comparing the values of the polarizing degree, the transmittance rate, and the color phase, of the produced film with the objective value, dying the obtained film in an aqueous solution that contains the recalculated amounts of the dichroic organic dye composition and coloration organic dye composition so as to obtain the objective values, and repeating the above steps until the colored low-polarizing film of a desired color that has the objective values is obtained.

Effects of Inventions

The present invention can produce the colored low-polarizing film that can be more widely selected its color tone, polarizing degree, and transmittance and that shows smaller changes in the color at a molding process, in particular a heat-curving process. Further, the present invention can produce a colored polarizing sheet and a colored polarizing lens that have the advantages of the colored low-polarizing film.

Means for Solving the Problems

Below, the technical features of the present invention are explained.

A resin film, which is as a base material for a polarizing film, is swollen in water and then immersed in a dyeing solution containing the dichroic organic dyes of the present invention while being directionally stretched to disperse the dichroic dye in the base resin in an oriented state, thereby obtaining a polarizing film to which polarization properties have been imparted.

As the base material for the polarizing film to be used in this case, polyvinyl alcohols may be used. As polyvinyl alcohols, polyvinyl alcohol (hereinafter, "PVA"), PVA in which a slight amount of the acetic acid ester structure remains, and PVA derivatives, or polyvinyl formal, polyvinyl acetal, saponified ethylene-vinyl acetate copolymer, etc., which are analogs of the PVA, are preferred, and PVA is particularly preferred.

Further, regarding the molecular weight of a PVA film, from the viewpoint of stretchability and film strength, the weight-average molecular weight is preferably 50,000 to 350,000, and particularly preferably 100,000 to 300,000. A molecular weight of 150,000 or more is particularly preferred. The scaling factor of stretching of the PVA film is preferably 2 to 8 times, preferably 3.5 to 6.5 times, and particularly preferably 4.0 to 6.0 times from the viewpoint of the dichroic ratio and film strength after stretching. The thickness of the PVA film after stretching is 10 μm or more. To handle without any unification with protection films, the thickness of the film is preferably about 20 to 50 μm.

A typical manufacturing process in the case of using PVA as a base film is as follows:
(1) Washing PVA with water to remove impurities while swelling it with water,
(2) Stretching,
(3) Dyeing it in a dyeing tank,
(4) Forming bridges and chelation by using boric acid or a metal compound, and
(5) Drying.

Steps (2), (3) (and optionally (4)), can be carried out sequentially or they can be carried out at the same time.

First, in the swelling and washing of step (1), by absorbing water, a PVA film that is easily broken in the dry state is uniformly softened to be stretchable at room temperature. Further, in this step, water-soluble plasticizers used in the manufacturing process of the PVA film are removed or optionally additives are preliminarily adsorbed. At this point, the PVA film is not uniformly and sequentially swollen and a variation in the degree of the swelling occurs. Even in this state, it is important to uniformly apply as small a force as possible to make uniform elongation and to avoid forming wrinkles. Further, in this step, it is most desirable that swelling simply be uniform, and excessive stretching should be minimized, since such stretching causes unevenness of the film.

In step (2), generally stretching is carried out so as to have a draw ratio of 2 to 8 times. In the present inventions, maintaining good processability is important. Thus, the draw ratio of stretching of the PVA film should be selected from 3 to 6 times, preferably from 4.0 to 6.0 times. Further, at this time preferably the orientation of the PVA film is maintained. The orientation relaxation of the PVA film in a stretch orientation state is advanced the longer it is in water and the longer the start of the drying step is prolonged. Thus, from the viewpoint of maintaining good properties, the time during stretching should be designed so as to be as short as possible. Further, after stretching excess water should be removed as soon as possible.

The dyeing of step (3) is accomplished by absorption or deposition of dyes to polymer chains of oriented polyvinyl alcohol film. From this mechanism, this step can be carried out before, at the same time as, or after the step for uniaxial stretching without a large variation. Since the interface is a surface with high restriction that can be easily oriented, it is preferable to select conditions that use this property. The temperature of step (3) is generally selected from 40-80° C. because of the requirement of high productivity. In the present invention, it is generally selected from 25-45° C., preferably 30-40° C., particularly 30-35° C.

Step (4) is carried out to improve resistance to heat, water, or organic solvents. Treatment with boric acid increases thermostability by forming cross bridges among PVA chains. This step can be carried out before, at the same time as, or after uniaxial stretching of the polyvinyl alcohol film without a large variation. Further, the latter, the metal compound, is used to form chelate compounds with dye molecules to stabilize. Generally, this step is carried out at or after the dyeing step.

As the metal compound, transition metals belonging to Period 4, Period 5 and Period 6 may be used. Among such metal compounds, those whose effects of heat resistance and solvent resistance have been confirmed to exist, but from the viewpoint of cost, metal salts such as acetates, nitrates and sulfates of fourth-period transition metals such as chromium, manganese, cobalt, nickel, copper and zinc are preferred. Among them, compounds of nickel, manganese, cobalt, zinc and copper are more preferred because they are inexpensive and excellent in the aforementioned effects. More specific examples thereof include manganese (II) acetate tetrahydrate, manganese (III) acetate dihydrate, manganese (II) nitrate hexahydrate, manganese (II) sulfate pentahydrate, cobalt (II) acetate tetrahydrate, cobalt (II) nitrate hexahydrate, cobalt (II) sulfate heptahydrate, nickel (II) acetate tetrahydrate, nickel (II) nitrate hexahydrate, nickel (II) sulfate hexahydrate, zinc (II) acetate, zinc (II) sulfate, chromium (III) nitrate nonahydrate, copper (II) acetate monohydrate, copper (II) nitrate trihydrate, and copper (II) sulfate pentahydrate. Any one of these metals may be used solely, and alternatively, a plurality of types of compounds may be used in combination.

Regarding the content of the metal compound and boric acid in the polarizing film, from the viewpoint of imparting heat resistance and solvent resistance to the polarizing film, the metal content of the metal compound is preferably 0.2 to 20 mg, and more preferably 1 to 5 mg, per 1 g of the polarizing film. The boron content of the boric acid as boron is preferably 0.3 to 30 mg, and more preferably 0.5 to 10 mg. The composition of the treatment solution to be used for the treatment is set so as to satisfy the above-described content. In general, it is preferred that the concentration of the metal compound is from 0.5 to 30 g/L and that the concentration of boric acid is from 2 to 20 g/L. Analysis of the content of metal and boron in the polarizing film can be conducted using atomic absorption spectrometry.

Generally, the immersion temperature to be used is the same as the temperature of the dyeing step. The immersion temperature is preferably 20 to 70° C., more preferably 20 to 45° C., more preferably 30 to 40° C., and particularly preferably 30 to 35° C. Further, the immersion time in the step is selected from 0.5 to 15 minutes.

In Step (5), the PVA film, which was already stretched, dyed, and suitably treated with boric acid or metal compounds, is dried. The PVA film has a heat resistance that depends on its moisture content. Thus, if the temperature increases when PVA film has a high moisture content, its uniaxal condition gets out of order, in a shorter period. Therefore, the dichroic ratio of the PVA film is decreased. Since the PVA film is dried from its surface, preferably it is dried from both surfaces. This step is preferably carried out by ventilation with dry air while removing vapor. Further, as is well known in the art, to prevent excess heating a method where evaporated moisture is immediately removed to accelerate evaporation is preferred. Such a method can dry the PVA film while suppressing a temperature increase. The temperature of the dry air is from the temperature that can substantially maintain the color of a dried film to generally 70° C. or higher, preferably at a temperature of 90 to 120° C. for 1 to 120 minutes, preferably for 3 to 40 minutes.

A polarizing PVA film for sunglasses is generally produced by the steps explained above.

In the present invention, step (3) uses:
(3-1) a dichroic organic dye composition that comprises a combination of dichroic organic dyes having a dichroic ratio of 13 or higher, used in an amount to keep the degree of polarization at 30% to 90%, and
(3-2) a coloration organic dye composition that comprises a combination of dyes having an extremely low dichroic ratio of 4 or less or substantially having no dichroic ratio, used in an amount yielding a desired dyed color, and
(3-3) both compositions are used to dye to produce the polarizing film of the present invention.

To obtain the desired degree of polarization and desired transmittance, the amount of the dichroic organic dye composition of (3-1) is selected such that the dichroic organic dye composition is used in an amount to obtain the lower limit of the required dichroic ratio. The coloration organic dye composition of (3-2) is used in an amount to provide transmittance of 50% to 8% and at least 5% smaller than the transmittance of a polarizing film obtained by using the dichroic organic dye composition only.

Since the dichroic organic dye composition is used together with the coloration organic dye composition to dye the polarizing film of the present invention, the transmittance and the polarizing degree of the PVA polarizing film dyed by the dichroic organic dye composition makes upper limits of the transmittance and the polarizing degree of the PVA polarizing film and the transmittance and the polarizing degree of the PVA polarizing film died by the coloration organic dye composition makes the lower limit of the transmittance and the polarizing degree of the PVA polarizing film. This brings about wide selectively in the transmittance and the polarizing degree. Further, the color tone is mainly controlled by the amount of the coloration organic dye composition. Thus, in the present invention, a wide range of the color tone can be obtained according to the ratio of the amounts used of both compositions without considering the change in the degree of polarization.

One embodiment to obtain the amounts to be used of the compositions that impart desired physical property values is:
(1) determining the physical property value of the PVA polarizing film dyed by each of the dichroic organic dyes and the physical property value of the PVA polarizing film dyed by each of the coloration organic dyes;
(2) calculating the amount of the dichroic organic dye composition and the coloration organic dye composition to be used to provide the desired physical property value without considering the synergistic effect brought about by the dichroic organic dye composition and the coloration organic dye composition in a simultaneous stain (hereafter, "calculated value 1");
(3) producing a polarizing film in an aqueous solution that contains both compositions in an amount based on calculated value 1 to determine the physical property value of the obtained film (hereafter, "physical property value 1");
(4) comparing physical property value 1 to the desired physical property value and readjusting calculated value 1 to obtain the desired physical property value (hereafter, "calculated value 2");
(5) producing a polarizing film in an aqueous solution that contains both compositions in an amount based on calculated value 2 to determine the physical property value of the obtained film (hereafter, "physical property value 2");
(6) comparing physical property value 2 with the desired physical property value;
(7) if physical property value 2 does not reach the desired physical property value, the adjustment of further calculated values, production of polarizing films, and determination of further physical property values are repeated accordingly.

A method to obtain a value that is recalculated the calculated value is a method that focuses on curves of the transmittance and the polarizing degree obtained by dying by the organic dichroic dye composition and the coloration organic dye composition. The range of the polarizing degree of the present invention is a middle range, for example, from 45 or more to less than 90%, preferably from 50 or more to less than 85%, more preferably from 55 or more to less than 80%. In these ranges, when the dichroic organic dye composition that shows high dichroic ration is used, the change of the transmittance over the change of the polarizing degree should be small. Thus, the transmittance is controlled by the coloration organic dye composition and the polarizing degree is controlled by the dichroic organic dye composition.

Among the dyes for which dichroic ratios have been estimated according a method described below, exemplary azo dyes having dichroic ratios of 13 or more are listed in but are not limited to the following. The azo dyes are denoted by their trade names. Color Index Generic Names, where known, are in parentheses.
SUMILIGHT SUPRA YELLOW BC CONC (C.I.Direct Yellow28)
KAYARUS LIGHT YELLOW F8G (C.I.Direct Yellow87)
KAYACELON YELLOW F8G C-2RL (C.I.Direct Yellow164)
DIRECT FAST ORANGE S (C.I.Direct Orange26)
SUMILIGHT SUPRA ORANGE 2GL 125% (C.I.Direct Orange39)
NIPPON FAST SCARLET GSX (C.I.Direct Red4)
FAST SCARLET 4BS (C.I.Direct Red23)
SUMILIGHT RED 4B (C.I.Direct Red81)
KAYARUS SUPRA BLUE BWL 143 (C.I.Direct Blue237)
KAYARUS SUPRA BROWN GL 125 (C.I.Direct Brown195)
KAYARUS SUPRA BROWN B2R (C.I.Direct Brown209)
KAYARUS SUPRA BROWN GTL (C.I.Direct Brown210)

In the points of stainability and heat resistance, direct dyes that comprise azo dyes that have a sulfonate group are preferable. By combining three or more of the azo dyes, the direct dyes are resolved or dispersed in a stain solution in an amount such that the polarizing film is stained at a desired color tone (in the present invention, the color tone is substantially colorless) and a desired transmittance. Inorganic salts, such as sodium sulfate, as a dyeing aid are suitably added to the stain solution.

Among the dyes for which dichroic ratios have been estimated according a method described below, exemplary dyes having an extremely low dichroic ratio of 4 or less or substantially having no dichroic ratio are listed in but are not limited to the following. The azo dyes are denoted by their trade names. Color Index Generic Names, where known, are in parentheses.
DIRECT BRILLIANT PINK B (C.I.Direct Red9)
KAYARUS LIGHT RED F5G (C.I.Direct Red225)
DIRECT LIGHT ROSE FR (C.I.Direct Red227)
SUMILIGHT SUPRA TURQUOISE BLUE G (C.I.Direct Blue86)
DIRECT SUPRA BLUE FFRL (C.I.Direct Blue108)
KAYARUS CUPRO GREEN G (C.I.Direct Green59)
DIRECT FAST BLACK B (C.I.Direct Black22)
SUNCHROMINE YELLOW MR (C.I.Mordant Yellow3)
CHROME YELLOW AS (C.I.Mordant Yellow5)
CHROME YELLOW 3R (C.I.Mordant Yellow8)
CHROME YELLOW PG (C.I.Mordant Yellow23)
CHROME ORANGE FL (C.I.Mordant Orange29)
CHROME RED B CONC. (C.I.Mordant Red7)
CHROME RED 5G (C.I.Mordant Red19)
SUNCHROMINE BRILLIANT VIOLET R CONC. (C.I.Mordant Violet1:1)
Chrome Fine Violet R (C.I.Mordant Violet1)
CHROME CYANINE BXS (C.I.Mordant Blue1)
MORDANT BLUE B 120% (C.I.Mordant Blue13)
CHROME CYANINE BLA (C.I.Mordant Blue29)
MORDANT GREEN L (C.I.Mordant Green17)
CHROME GREEN 3B-N (C.I.Mordant Green28)
MORDANT BROWN KS (C.I.Mordant Brown15)

CHROME BROWN LE (C.I.Mordant Brown19)
CHROME BROWN RH (C.I.Mordant Brown33)
CHROME BLACK P2B (C.I.Mordant Black7)
CHROME BLACK PLW (C.I.Mordant Black9)
CHROME BLACK ET-1 (C.I.Mordant Black11)
CHROME NAVY CR 158% (C.I.Mordant Black17)
CHROME LIGHT GREY G (C.I.Mordant Black38)
CHROME BORDEAUX FB
ALIZARINE CHROME BRILLIANT BLUE BL
CHROME BLUE 2G
SUMIFIX YELLOW GR 150% (C.I Reactive Yellow15)
LANASOL YELLOW 4G (C.I Reactive Yellow39)
SUMIFIX GOLDEN YELLOW GG (A) 150% (C.I Reactive Yellow76)
KAYACION YELLOW E-S4R (C.I Reactive Yellow84)
NOVACRON YELLOW P-6GS GRAN (C.I Reactive Yellow95)
KAYACION YELLOW E-SNA (C.I Reactive Yellow102)
KAYACION YELLOW E-SN4G (C.I Reactive Yellow105)
DRIMARENE YELLOW K-2R CDG (C.I Reactive Yellow125)
SUMIFIX SUPRA YELLOW 3RF 150% GRAN (C.I Reactive Yellow145)
SUMIFIX SUPRA BRILLIANT YELLOW 3GF 150% GR (C.I Reactive Yellow167)
NOVACRON YELLOW C-R (C.I Reactive Yellow168)
NOVCRON YELLOW C-5G (C.I Reactive Yellow175)
KAYACION YELLOW CF-3RJ 150
KAYACION YELLOW E-CM
PROCION ORANGE PX-RN (C.I.Reactive Orange5)
REMAZOL BRILLIANT ORANGE 3R SPECIAL (C.I.Reactive Orange16)
LEVAFIX YELLOW E-3RL GRAN (C.I.Reactive Orange30)
LEVAFIX ORANGE E-3GA GRAN (C.I.Reactive Orange64)
REMAZOL GOLDEN YELLOW RNL GRAN 150% (C.I. Reactive Orange107)
KAYACION YELLOW CF-3RJ 150
KAYACION YELLOW E-CM
PROCION ORANGE PX-RN (C.I.Reactive Orange5)
REMAZOL BRILLIANT ORANGE 3R SPECIAL (C.I.Reactive Orange16)
LEVAFIX YELLOW E-3RL GRAN (C.I.Reactive Orange30)
LEVAFIX ORANGE E-3GA GRAN (C.I.Reactive Orange64)
REMAZOL GOLDEN YELLOW RNL GRAN 150% (C.I. Reactive Orange107)
DRIMAREN RUBINOL X3LR CDG (C.I.Reactive Red55)
BRILLIANT RED G SPL (C.I.Reactive Red112)
BRILLIANT RED 7BF LIQ 25% (C.I.Reactive Red114)
LANASOL RED 2G (C.I.Reactive Red116)
LEVAFIX SCARLET E-2GA GRAN (C.I.Reactive Red124)
LEVAFIX BRILLIANT RED E-4BA GRAN (C.I.Reactive Red158)
LEVAFIX BRILLIANT RED E-6BA GRAN (C.I.Reactive Red159)
REMAZOL BRILLIANT RED F3B GRAN (C.I.Reactive Red180)
SUPRA BRILLIANT RED 3BF 150% GRAN (C.I.Reactive Red195)
REMAZOL RED RB 133% (C.I.Reactive Red198)
SUPRA SCARLET 2GF 150G (C.I.Reactive Red222)
NOVACRON RED P-6B GRAN. 150%
NOVACRON RED C-2G
KAYACION VIOLET A-3R (C.I.Reactive Violet1)
REMAZOL BRILL. VIOLET 5R (C.I.Reactive Violet5)
DRIMAREN VIOLET K-2 RL CDG (C.I.Reactive Violet33)
REMAZOL BRILL. BLUE RN (C.I.Reactive Blue19)
SUMIFIX TURQUOISE BLUE G (N) CONC. (C.I.Reactive Blue21)
NOVACRON BLUE P-3R IN (C.I.Reactive Blue49)
LANASOL BLUE 3R (C.I.Reactive Blue50)
DRIMARENE BLUE X-3LR CDG (C.I.Reactive Blue52)
LANASOL BLUE 3G (C.I.Reactive Blue69)
NOVACRON TURQUOISE P-GR 150% (C.I.Reactive Blue72)
DRIMARENE NAVY X-RBL CDG (C.I.Reactive Blue79)
LANASOL BLUE 8G-01 150% (C.I.Reactive Blue185)
DRIMARENE BLUE K-2RL CDG (C.I.Reactive Blue209)
SUMIFIX SUPRA BLUE BRF 150% GRAN. (C.I.Reactive Blue221)
SUMIFIX SUPRA NAVY BLUE BF GRAN. (C.I.Reactive Blue222)
SUMIFIX SUPRA TURQUOISE BLUE BGF (N) (C.I.Reactive Blue231)
NOVACRON BLUE C-R (C.I.Reactive Blue235)
KAYACION BLUE CF-GJ 150
KAYACION BLUE CF-BL
KAYACIN MARINE E-CM
KAYACION NAVY E-CM
SUMIFIX SUPRA NAVY BLUE 3GF 150% GRAN
LEVAFIX BROWN E-2R GRAN (C.I.Reactive Brown19)
NOVACRON BROWN P-6R GRAN. 150
REMAZOL BLACK B-N 150% (C.I.Reactive Black5)
REMAZOL BLACK RL 133% (C.I.Reactive Black31)
REMAZOL DEEP BLACK N 150% (C.I.Reactive Black31)
ACID QUINOLINE YELLOW WS H/C (C.I.Acid Yellow3)
KAYACYL YELLOW GG 80 (C.I.Acid Yellow17)
TARTRAZINE NS CONC (C.I.Acid Yellow23)
SUMINOL FAST YELLOW R CONC. (C.I.Acid Yellow25)
KAYANOL MILLING YELLOW O (C.I.Acid Yellow38)
SUMINOL MILLING YELLOW MR (C.I.Acid Yellow42)
AMINYL YELLOW E-3GL (C.I.Acid Yellow49)
SUMINOL FAST YELLOW G (B) (C.I.Acid Yellow61)
ERIONYL YELLOW B-4G (C.I.Acid Yellow79)
KAYANOL YELLOW N5G (C.I.Acid Yellow110)
LANYL YELLOW G EX CC (C.I.Acid Yellow116)
KAYAKALAN YELLOW GL 143 (C.I.Acid Yellow121)
KAYANOL MILLING YELLOW 5GW (C.I.Acid Yellow127)
LANACRON YELLOW N-2GL KWL (C.I.Acid Yellow129)
ERIONYL GOLDEN YELLOW M-R-02 (C.I.Acid Yellow151)
TECTILON YELLOW 2G 200% (C.I.Acid Yellow169)
LANACRON YELLOW S-2G-01 KWL (C.I.Acid Yellow220)
TELON YELLOW RLN MICRO (C.I.Acid Yellow230)
TECTILON YELLOW 3R 200% (C.I.Acid Yellow246)
CHUGANOL FAST YELLOW 5GL (C.I.Acid Yellow40:1)
SOLAR ORANGE (C.I.Acid Orange7)
SOLAR LIGHT ORANGE GX (C.I.Acid Orange10)
CHUGANOL MILLING BROWN 5R (C.I.Acid Orange51)
CHUGANOL MILLING ORANGE SG (C.I.Acid Orange56)
KAYANOL YELLOW N3R (C.I.Acid Orange67)
AMINYL YELLOW E-3 RL (C.I.Acid Orange67)
LANYL ORANGE R 200% (C.I.Acid Orange88)
CHUGANOL MILLING ORANGE GSN 150% (C.I.Acid Orange95)

SUMINOL MILLING ORANGE GN (N) (C.I.Acid Orange95)
ISOLAN ORANGE K-RLS (C.I.Acid Orange107)
TELON ORANGE AGT 01 (C.I.Acid Orange116)
LANYL ORANGE 2R E/C (C.I.Acid Orange120)
SUPRALAN ORANGE S-RL (C.I.Acid Orange166)
LANASYN YELLOW M-2RL 180 (C.I.Acid Orange180)
NYLOSAN ORANGE NRL 250 (C.I.Acid Orange250)
LANASYN ORANGE M-RL P
SILK SCARLET (C.I.Acid Red9)
BRILLIANT SCARLET 3R CONC. (C.I.Acid Red18)
ACID RHODAMINE G CONC (C.I.Acid Red50)
ACID RHODAMINE B CONC (C.I.Acid Red52)
CHUGACID RED FCH (C.I.Acid Red73)
CHUGACID RUBINOL 3B 200% (C.I.Acid Red80)
ROCCELINE NS CONC. 120% (C.I.Acid Red88)
CHUGANOL ANTHRACENE RED G (C.I.Acid Red97)
SUMINOL FAST RED G (B) (C.I.Acid Red118)
SUMINOL MILLING BRILLIANT RED 3BN (N) CONC. (C.I.Acid Red131)
LANYL RED GG (C.I.Acid Red211)
LANYL RED B (C.I.Acid Red215)
LANASYN BORDEAUX M-RLA200 (C.I.Acid Red217)
SUMINOL MILLING BRILLIANT RED B CONC. N (C.I.Acid Red249)
AMINYL RED E-3BL (C.I.Acid Red257)
TELON RED M-BL (C.I.Acid Red260)
CHUGAI AMINOL FAST PINK R (C.I.Acid Red289)
NYLOSAN RED N-2RBL SGR (C.I.Acid Red336)
TELON RED FRL MICRO (C.I.Acid Red337)
LANASYN RED M-G (C.I.Acid Red399)
KAYAKALAN RED BL
NYLOSAN RED EBL SGR 180
KAYANOL MILLING RED BW
KAYANOL MILLING VIOLET FBW (C.I.Acid Violet48)
ERIONYL RED B-10B-01 (C.I.Acid Violet54)
CHUGAI AMINOL FAST VIOLET F6R (C.I.Acid Violet102)
ACID PURE BLUE VX (C.I.Acid Blue1)
ACID BRILLIANT BLUE AF-N (C.I.Acid Blue7)
CHUGACID LIGHT BLUE A (C.I.Acid Blue25)
KAYANOL BLUE N2G (C.I.Acid Blue40)
NYLOSAN BLUE E-GL P 250 (C.I.Acid Blue72)
CHUGANOL BLUE 6B 333% (C.I.Acid Blue83)
CHUGANOL BLUE G 333% (C.I.Acid Blue90)
KAYANOL NAVY BLUE R (C.I.Acid Blue92)
SUMINOL MILLING BRILLIANT SKY BLUE SE (N) (C.I.Acid Blue112)
SUMINOL MILLING CYANINE 5R (N) (C.I.Acid Blue113)
KAYANOL MILLING BLUE GW (C.I.Acid Blue127)
LANYL BRILLIANT BLUE G EX CC (C.I.Acid Blue127:1)
KAYANOL BLUE NR (C.I.Acid Blue129)
KAYANOL MILLING BLUE BW (C.I.Acid Blue138)
KAYANOL MILLING BLUE 2RW (C.I.Acid Blue140)
LANYL BLUE 3G EX CONC (C.I.Acid Blue171)
NYLOSAN BLUE N-GL 150 (C.I.Acid Blue230)
TECTILON BLUE 6G 200% (C.I.Acid Blue258)
TELON BLUE AFN (C.I.Acid Blue264)
TECTILON BLUE 4R-01 200% (C.I.Acid Blue277:1)
NYLOSAN B BLUE N-FL SGR180 (C.I.Acid Blue278)
NYLOSAN BLUE N-5GL SGR 200 (C.I.Acid Blue280)
KAYALAX NAVY R (C.I.Acid Blue300)
NYLOSAN BLUE N-BLN (C.I.Acid Blue350)
LANACRON BLUE N-3GL
ACID GREEN V (C.I.Acid Green16)
CHUGANOL CYANINE GREEN G (C.I.Acid Green25)
SUMINOL MILLING BROWN 5R (C.I.Acid Brown51)

The dyes listed above are generally not called dichroic dyes. The dyes (pigments) listed supra that show high dichroic ratios are disclosed various references. Thus, one (skilled in the art) can know the dichroic ratio of the dyes that show high dichroic ratios. However, for the dyes that are used in the coloration organic dye composition, either dichroic ratios have not been used or there was no reason to use dichroic ratios. Thus, the inventors do not find any references to explain the technical meaning of the dyes that show extremely low dichroic ratios. Thus, the dyes listed above, which are publicly known and are not known as dyes showing high dichroic ratio, are used in the coloration organic dye composition and are one example that is proved in the examples below.

The dichroic ratio is the value that is obtained by dyeing the PVA films with these dyes in the method described below. For example, in a case where a degree of polarization of 99% or more is required, the dichroic ratio of the coloration organic dye composition contributes to an increase in the degree of polarization. However, a change derived from such a contribution can be ignored because of the scope of such a high polarization. On the other hand, the present invention requires less than 90%, e.g., about 60% of the degree of polarization. Thus, even though the coloration organic dyes show low dichroic ratios, an effect to increase a degree of polarization of the dyes cannot be ignored. Thus, one must select the amount to be used etc., based on that fact. The degree of the dichroic ration relates to a color change occurred in heating processes. If the composition shows a high dichroic ratio, large color change would be seen. In any case, when the PVA film is dyed, the composition that shows a smaller dichroic ratio is preferable because of the small change in the degree of polarization and the small change in color tone during a heating process.

In the present invention, the dichroic ratios of the dyes that are used in the dichroic organic dye composition and the coloration organic dye composition mean the values measured at the maximum absorption wavelength of a polarizing film produced by using dichroic dyes instead of iodine under the manufacturing conditions where the polarizing film produced by using iodine shows dichroic ratios measured at 600 nm of 60 or more.

Next, a transparent protection sheet that consists of transparent plastic sheet is laminated to each surface of the low-polarizing film via an adhesive layer to produce a polarizing sheet. The transparent plastic sheet generally has a thickness of 0.1-1 mm. It has a single layer or multiple layers that are obtained by a co-extrusion method. For example, it may be a co-extruded sheet of an aromatic polycarbonate and polyacrylate. Further, in the present invention, the surface that is a concave curve made by a curving process, where resin is injected is preferably an aromatic polycarbonate. Further, generally the polarizing sheet of the present invention (hereafter, "the present polarizing sheet") has protection films on both sides. In general, it goes through a punching process to produce lens shaped products. Then, the products undergo a heat-curving process. Then, the protection films of both sides are removed. Then, the products are set in the injection mold and are unified with the injected aromatic polycarbonate to produce injection molding polarizing lenses.

Transparent plastic materials that are used for the present invention are selected from transparent resins consisting of aromatic polycarbonates, noncrystal polyolefins, polyacrylate, polysulfate, acetylcellulose, polystyrene, polyester, polyamide, and a composition of aromatic polycarbonate and alicyclic polyester, and mixtures thereof. Among them, to produce most general polarizing films, acetylcellulose may be used. Because of the properties of the mechanical strength and impact resistance, aromatic polycarbonates are preferable. Because of chemical resistance, polyolefins, polyacrylate, and polyamide are preferable. Because of the dyeability after molding lenses, polyacrylate, and polyamide are preferable.

As a resin material for the aromatic polycarbonate sheet to be used in this case, from the viewpoint of film strength, heat resistance, durability, or curving workability, polymers produced according to the well-known method from a bisphenol compound typified by 2,2-bis(4-hydroxyphenyl) alkane or 2,2-(4-hydroxy-3,5-dihalogenophenyl)alkane are preferred. The polymer skeleton thereof may include a structural unit derived from a fatty acid diol or a structural unit having ester bonds. In particular, an aromatic polycarbonate induced from 2,2-bis(4-hydroxyphenyl)propane is preferred.

Regarding the molecular weight of the aromatic polycarbonate, the viscosity-average molecular weight is preferably 12,000 to 40,000, and the viscosity-average molecular weight is particularly preferably 20,000 to 35,000. Further, the aromatic polycarbonate shows a large photoelastic constant. And colored interference fringe easily occur based on birefringence derived from stress and orientation. Thus, it is preferable to blind the colored interference fringe by having a high retardation value in advance. Thus, a lower limit of 2,000 nm or higher and an upper limit of 20,000 nm or lower is preferable. The lower limit of 3,000 nm or higher is more preferable. In particular, considering the decrease in the retardation value in processing steps, preferably the lower limit should be 4,000 nm or higher. When the retardation value is higher, a colored interference fringe is not easily generated. However, since the retardation value denotes degrees of orientation and residual stress, there is a disadvantage in that if the retardation value is higher, the precision of the surface shape is lower. The colored interference fringe can see by person's eyes only through the polarizing film. Thus, the effect of the polarizing sheet that has a high retardation value should be clear when the film can be used on the side where the light enters, i.e., the side opposite the human eyes.

In the present invention, alicyclic polyester resins can be used as a component of a composition of an aromatic polycarbonate to produce a sheet or film of the protective layers, and a resin for injection molding to produce lenses. The resins are obtained by well-known methods for example esterification or transesterification of dicarboxylic acid components represented by 1,4-cyclohexane dicarboxylic acid, a diol components represented by 1,4-cyclohexane dimethanol, and minor components if required, followed by a polycondensation reaction that is carried out by suitably adding polymerization catalysts and gradually reducing the pressure of the reactor.

Polyamide resins used in the present invention are those known as polyamide resins for producing lenses. The heat deformation temperature, which is an index for heat resistance, of such polyamide resins is in a range of from 100° C. to 700° C. Specific polyamide resins are aromatic polyamide resins, alicyclic polyamide resins, aliphatic polyamide resins, and copolymers thereof. The alicyclic polyamide resins are preferable in terms of their mechanical strength, chemical resistance, transparency, etc. However, two or more types of polyamide resins can be combined. Exemplary combined polyamide resins are but are not limited to GLILAMID TR FE5577, XE 3805 (EMS), NOVAMID X21 (Mitsubishi Engineering-Plastics), and Toyobo Nylon T-714E (Toyobo).

(Meth) acrylic resins may be homopolymers of each (meth) acrylic ester, such as polymethyl methacrylate (PMMA), methyl methacrylate, or copolymers of PMMA, MMA, and one or more of their monomers, or mixtures of some of these polymers. A (meth) acrylate that has a cyclic alkyl structure is preferable because it has low birefringence, low hygroscopicity, and high heat resistance. Examples of such (meth) acrylic-based resins include ACRYPET (trademark; produced by Mitsubishi Rayon Co., Ltd.), DELPET (trademark; produced by Asahi Kasei Chemicals Corporation), PARAPET (trademark; produced by Kuraray Co., Ltd.), and the like.

An adhesive layer is used for bonding a transparent protective layer and the polarizing film. Usable adhesives include polyvinylalcohol resin-based materials, acrylic resin-based materials, urethane resin-based materials, polyester resin-based materials, melamine resin-based materials, epoxy resin-based materials, silicone resin-based materials, and the like. When the aromatic polycarbonates are used, from the viewpoint of transparency when they are bound and adhesiveness with the aromatic polycarbonates, a two-liquid thermosetting urethane resin containing a polyurethane prepolymer, which is a urethane resin-based material and a curing agent, is preferable. The structures of the layers of the aromatic polycarbonate polarizing sheet of the present invention that is used for producing sunglasses are not limited to those explained above. For the adhesive agents that bind the polarizing film and transparent protective layers, polarizing sheets may be used that also have photochromic properties produced by using adhesive agents that are obtained by dissolving photochromic dyes.

The protective layers of the present invention are selected based on producing conditions that do not substantially change the functions of the functional layers under suitable processing conditions. For example, when selective reflection films that consist of polyester-based super multi layers are used together with the transparent protective layers, to make the thickness of a single layer of the super multi layers ¼λ, production and stretching of multi-layer sheets are repeated until it has an optical thickness of interest. (This is the same principal as that for producing cylindrical candy in which a design appears in the cross section wherever it is sliced.) Thus, for processing conditions under which the functions of the protecting layers are maintained, it is necessary to select temperatures and time so that the protection layers do not substantially relax from a stretched state during the processing steps.

Next, the polarizing sheet of the present invention goes through a punching process to produce lens shaped products. Then, the products undergo a curving process. From the viewpoint of the productivity of each lens-shaped product, the process to produce lens shaped products is carried out by using a punching blade that consists of a Thomson blade to punch plural lens-shaped products. The specific shape of each lens-shaped product is selected based on the configuration of the finished product (such as sunglasses, goggles). A typical lens-shaped product is a disk that has an 80 mm diameter or a slit shape that is cut in the same width at both ends in a direction perpendicular to the polarization axis. Further, as explained in the section about the selection of the type of protection sheet of the polarizing sheet of the present invention, the conditions of the curving process are determined based on the conditions where degradation of layers that demonstrate the functionality of the polarizing sheet do not occur substantially.

When the aromatic polycarbonate polarizing sheet is used as an injection molding polarizing lens, in the curving process the sheet is curved along the surface of the mold used for injection molding. In the polarizing sheet of the present invention, when high retardation aromatic polycarbonate sheets are used as protection layers, since the polarizing film is easy to tear along the stretched direction, conditions are selected so as not to make such tears. The temperature of the mold in the curving process of the aromatic polycarbonate polarizing sheet is preferably lower than the glass transition temperature of the aromatic polycarbonate used in the polycarbonate polarizing sheet. Further, preferably, the temperature of the stretched polycarbonate polarizing sheet just before the curving process is controlled by a preheating treatment to be within the range of from a temperature lower than 50° C. less than the glass transition temperature of the aromatic polycarbonate to a temperature less than the glass transition point. In particular, a temperature lower than 40° C. less than the glass transition temperature of the aromatic polycarbonate to a temperature less than 5° C. lower than the glass transition temperature is preferable.

Next, an aromatic polycarbonate is injected into the curved polarizing sheet to produce an induction molding lens. Conditions for injection molding are not particularly limited, but the conditions should be an excellent outer appearance is required. From this point, conditions for injection molding that can obtain molding lenses that have as high a filling ratio as possible, such as filling ratio, injection pressure, holding pressure, weighing, and molding cycle, should be selected. The temperature of the resins is [the melting point of] an aromatic polycarbonate resin and is selected from 260-320° C., accordingly. The molding temperature is preferably a temperature that is from equal to or lowers than a temperature 100° C. lower than the glass-transition temperature of the aromatic polycarbonate resin and more preferably a temperature that is a temperature from 80° C. lower than the glass-transition temperature and lower than a temperature 15° C. lower than the glass-transition temperature. Particularly, a temperature that is a temperature from 70° C. lower than the glass-transition temperature to lower than a temperature 25° C. lower than the glass-transition temperature is preferable.

Next, the hard coating treatment may be carried out. The materials for hard coating and the processing conditions are not particularly limited, but an excellent outer appearance and adhesiveness with respect to the aromatic polycarbonate as the base or inorganic layers such as a mirror coat and an antireflection coat to be subsequently applied are required. From this viewpoint, the firing temperature is preferably a temperature that is from equal to or higher than a temperature 50° C. lower than the glass-transition temperature of the aromatic polycarbonate used for the stretched polycarbonate polarizing sheet to lower than the glass-transition temperature, and particularly preferably a temperature that is from equal to or higher than a temperature 40° C. lower than the glass-transition temperature to lower than a temperature 15° C. lower than the glass-transition temperature, i.e., a temperature around 120° C. The time required for firing the hard coat is about 30 minutes to 2 hours.

EXAMPLES

(A) Producing Polarizing Films

Below, the preferable embodiments are explained.

As the dyes that comprise the dichroic organic dye composition that imparts polarizations and the coloration organic dye composition that imparts color tones, those listed below were used. The concentrations of the dyes to be used and the dichroic ratios of them were determined based on the results of optical measurements of a monoaxially stretched PVA film that was stained by using each dye. For reference, the determined dichroic ratio is shown in parentheses after the dye's name.

Examples 1-5 and the Referenced Example

(1) Dichroic Organic Dye Composition

Dichroic organic dye composition A:
Blue 1: C.I.Direct Blue 237 (19.9); Red 1: C.I.Direct Red 81 (22.0); and Yellow 1: C.I.Direct Orange 39 (23.6)
Dichroic organic dye composition B:
Blue 2: C.I.Direct Blue 78 (9.2); Red 2: C.I.Direct Red 254 (10.9); and Yellow 2: C.I.Direct Yellow 12 (9.0)

(2) Coloration Organic Dye Composition

Coloration organic dye composition a:
Blue 3: Kayacion Blue CF-BL (1.3); Red 3: Novacron Red C-2G (1.4); and Yellow 3: C.I.Reactive Yellow 145 (2.6)
Coloration organic dye composition b:
Blue 4: C.I.Direct Blue 86 (1.7); Red 4: C.I.Direct Red 225 (2.5); and Yellow 4: C.I Mordant Yellow8 (1.7)
Coloration organic dye composition c:
Blue 4: C.I.Direct Blue 86 (1.7); Blue 5: C.I.Direct Blue 108 (1.6); Red 5: C.I.Direct Red 227 (1.6); and Yellow 5: C.I Mordant Yellow 5 (2.5)

By the method explained below the determination of the dichroic ratio of each organic dye was carried out.
The Dichroic Ratios of the Organic Dyes:
(Production of Samples to be Measured)

The dichroic ratios of the dichroic organic dyes and the coloration organic dyes of the present invention were estimated by the method for measurement of the polarizing film dyed by each dye, instead of using a method using iodine under conditions to obtain 60 or more of a dichroic ratio if the polarizing film were stained by iodine.
(The Method for Measurement)

For each dye a polarizing film was produced and the dichroic ratio was measured. The following formula and the value of each dye at its maximum absorption wavelength were used to calculate the dichroic ratio.

$$\text{The dichroic ratio} = Az/Ax$$

where $Ax$ represents the absorbance of linearly-polarized light in the maximum transmission direction, and $Az$ represents the absorbance of linearly-polarized light in a direction perpendicular to the maximum transmission direction. $Ax$ and $Az$ were measured by allowing the linearly-polarized light to be incident to the sample, using a spectrophotometer manufactured by Shimadzu Corporation (UV-3600).

(3) Producing Polarizing Film

Polyvinyl alcohol (PVA) (Kuraray Co., Ltd., trade name: VF-PS#7500) was caused to swell in water at 35° C. for 270 seconds while it was being stretched two-fold.

After that, the PVA was dyed in an aqueous solution containing the dye compositions listed in Table 1 and 10 g/L of anhydrous sodium sulfate at 35° C. During this process, it was further stretched. This dyed film was immersed in an aqueous solution containing 2.3 g/L of nickel acetate and 4.4 g/L of boric acid at 35° C. for 120 seconds while being stretched 5.6-fold. The film was dried at room temperature for 3 minutes in a state where the tension was maintained, and then subjected to a heat treatment at 110° C. for 3 minutes, whereby a polarizing film was obtained.

The constituents and the amounts of the dichroic organic dye compositions and the coloration organic dye compositions are listed in Table 1 below.

Calculated value: values obtained by a calculation based on the results of the measurements explained above for each organic dye without considering any interaction when the plural organic dyes are used at the same time;

Measured value: values obtained from experiments carried out based on the calculated value;

After color adjustment (Example 1): values obtained by adjusting the concentration of the coloration organic dye compositions: The concentration is mainly controlled so as to obtain the transmittance of interest.

After adjustment: values of the concentrations of the dichroic organic dye compositions and the coloration organic dye compositions were adjusted so as to have the transmittance and the degree of polarization of interest: The concentrations of the dichroic organic dye compositions were mainly increased to obtain the transmittance of interest. The concentrations of the coloration organic dye compositions were mainly decreased to obtain the degree of polarization of interest.

Next, the degree of polarization and the color tones of the obtained polarizing films are shown in Table 2. The degree of polarization was obtained by the following formula:

$$\text{Degree of polarization} = 100 \times (\tau p\max - \tau p\min)/(\tau p\max + \tau p\min),$$

wherein, $\tau p\max$ is the maximum value of luminous transmittance measured by the incident of linearly polarized light and $\tau p\min$ is the minimum value of luminous transmittance measured by the incident of linearly polarized light. $\tau p\max$ and $\tau p\min$ are the values that express $Ax$ and $Az$ as the luminous transmittance.

Based on the results of Example 1, the changes of the color and the polarizing degree of Examples 2-5 were considered to show the same changes as for Example 1. Further, it was found that the coloration polarizing dyes, which show low dichroic ratios, increase the polarizing degree to the extent that it is not negligible. Thus, based on the measured values the compositional ratios after the color adjustment and after the polarizing degree adjustment were estimated and produce the films of the examples. The tolerances of colors (L*, a*, and b*) are ±2%. The tolerance of the polarizing degree is ±3%. Examples 3, 4, and 5 were embodiments where the same processes were repeated. From these examples one can see the reproducibility of the method for producing the polarizing film of the present invention.

TABLE 1

| | | Dichroic organic dye composition (g/L) | | | | Coloration organic dye composition (g/L) | | | | | | | | | |
| --- | --- | --- | --- | --- | --- | --- | --- | --- | --- | --- | --- | --- | --- | --- | --- |
| | | Type | Blue1/ Blue 2 | Red 1/ Red 2 | Yellow1/ Yellow2 | Type | Blue3 | Blue4 | Blue5 | Red3 | Red4 | Red5 | Yellow3 | Yellow4 | Yellow5 |
| Example 1 | Calculated value | A | 0.110 | 0.015 | 0.036 | c | | 0.089 | 0.358 | | 0.336 | | | 0.419 | |
| | Measured value | | " | " | " | | | " | " | | " | | | " | |
| | After color adjustment | | " | " | " | | | 0.200 | 0.799 | | 0.540 | | | 0.964 | |
| | After adjustment | | 0.066 | 0.009 | 0.018 | | | " | | | | | | | |
| Example 2 | Calculated value | A | 0.555 | 0.008 | 0.018 | b | | 0.391 | | | 0.336 | | | 0.419 | |
| | Measured value | | " | " | " | | | " | | | " | | | " | |
| | After adjustment | | 0.044 | 0.006 | 0.014 | | | 1.097 | | | 0.400 | | | 1.040 | |
| Example 3 | Calculated value | A | 0.187 | 0.025 | 0.062 | a | | 0.223 | | | 0.212 | | | 0.214 | |
| | Measured value | | " | " | " | | | " | | | " | | | " | |
| | After adjustment | | 0.178 | 0.024 | 0.059 | | | 0.533 | | | 0.384 | | | 0.555 | |
| Example 4 | Calculated value | A | 0.152 | 0.023 | 0.054 | a | 0.401 | | | 0.266 | | | 0.289 | | |
| | Measured value | | " | " | " | | " | | | " | | | " | | |
| | After adjustment | | 0.128 | 0.017 | 0.041 | | 0.617 | | | 0.496 | | | 0.640 | | |
| Example 5 | Calculated value | A | 0.187 | 0.025 | 0.062 | b | | 0.223 | | | 0.212 | | | 0.214 | |
| | Measured value | | " | " | " | | | " | | | " | | | " | |
| | After adjustment | | 0.178 | 0.024 | 0.059 | | | 0.527 | | | 0.361 | | | 0.535 | |
| Reference Example | After adjustment | B | 0.940 | 0.110 | 0.130 | | | | | | | | | | |

TABLE 2

| | Transmittance (%) | Color tones L* | a* | b* | Degree of polarization (%) |
|---|---|---|---|---|---|
| Example 1 | | | | | |
| Calculated value | 19.6 | 51.4 | −0.8 | −3.4 | 61.0 |
| Measured value | 29.2 | 61.0 | −1.0 | −2.1 | 57.5 |
| After color adjustment | 20.0 | 51.9 | −1.3 | −3.5 | 65.2 |
| After adjustment | 19.5 | 81.2 | −0.7 | −1.6 | 60.3 |
| Example 2 | | | | | |
| Calculated value | 19.6 | 51.4 | −0.8 | −3.4 | 60.3 |
| Measured value | 30.1 | 61.8 | 5.3 | −3.1 | 54.9 |
| After adjustment | 20.1 | 51.9 | 0.8 | −1.4 | 62.9 |
| Example 3 | | | | | |
| Calculated value | 25.0 | 57.1 | −0.8 | −3.4 | 79.7 |
| Measured value | 34.2 | 65.1 | 1.5 | −5.3 | 68.8 |
| After adjustment | 24.0 | 56.1 | 0.7 | −0.3 | 80.3 |
| Example 4 | | | | | |
| Calculated value | 20.0 | 51.8 | −0.8 | −3.4 | 60.0 |
| Measured value | 27.2 | 59.2 | −1.6 | −5.8 | 62.0 |
| After adjustment | 20.3 | 52.1 | −2.4 | −2.5 | 59.7 |
| Example 5 | | | | | |
| Calculated value | 25.0 | 57.1 | −0.8 | −3.4 | 80.0 |
| Measured value | 34.2 | 65.1 | 1.5 | −5.3 | 68.8 |
| After adjustment | 24.0 | 56.1 | 0.7 | −3.0 | 80.3 |
| Reference Example | | | | | |
| After adjustment | 20.5 | 52.4 | −1.6 | −2.6 | 99.4 |

As is clearly understood from these examples, in colored polarizing films that are produced by using the dichroic organic dye compositions, which show 13 or more of a dichroic ratio, and the coloration organic dichroic dye compositions, which show 4 or less of a dichroic color, polarizing films that have a transmittance of interest with an adjusted low degree of polarization can be produced. Next, by using the polarizing films obtained in Examples 4 and 5, an aromatic polycarbonate polarizing sheet was produced.

(B) Aromatic Polycarbonate Polarizing Sheet

A urethane-based adhesive was applied to the polarizing film obtained in (A) using a bar coater #12, then dried at 70° C. for 10 minutes. After that, an aromatic polycarbonate sheet 0.3 mm thick and having a retardation value of 5,500 nm (Mitsubishi Gas Chemical Co., Inc.) was bonded to the polarizing film using a laminating machine so that both the stretch axis of the aromatic polycarbonate sheet and the stretch axis of the polarizing film were in a direction horizontal to the polarizing lens. The adhesive was applied to the polarizing film side of the laminated sheet in the same way as above, and another aromatic polycarbonate sheet was bonded thereto in the same way, whereby an aromatic polycarbonate polarizing sheet was obtained. The coated adhesive after curing was 9 to 11 μm thick.

(C) Measurement of Absorbance of Aromatic Polycarbonate Polarizing Lens

The transmittance and the color tone of the prepared aromatic polycarbonate polarizing sheet were measured using a spectrophotometer manufactured by Shimadzu Corporation (UV-3600). The results are shown in Table 3.

(D) Aromatic Polycarbonate Polarizing Lens

The aromatic polycarbonate polarizing sheet obtained in (B) was subjected to the curving process using a mold having a base curve of 7.95 (curvature radius: 66.67 mm). In the curving process, the forming was carried out under the following conditions: mold temperature: 137° C., and retention time: 1,200 seconds. The base curve as used herein refers to the curvature of the front surface of the lens, and it is a value obtained by dividing 530 by the curvature radius (in millimeters). There were no cracks in the polarizing film of the aromatic polycarbonate polarizing lens after the curving process. The transmittance and color tone of the aromatic polycarbonate polarizing lens after the curving process of the samples were measured in a way similar to that in (C). The color difference $\Delta E^*ab$ in the CIE1976 ($L^*a^*b^*$) color space before and after forming is shown in Table 3. The color difference was obtained by the following formula:

$$\text{Color difference: } \Delta E^*ab = ((\Delta L^*)^2 + (\Delta a^*)^2 + (\Delta b^*)^2)^{(1/2)}$$

TABLE 3

Color tones of produced polycarbonate polarizing sheet before and after curving process

| | Before curving process | | | | | After curving process | | | | | Color difference at curving process |
|---|---|---|---|---|---|---|---|---|---|---|---|
| | Transmittance | Color tone | | | Polarizing degree | Transmittance | Color tone | | | Polarizing degree | |
| | (%) | L* | a* | b* | (%) | (%) | L* | a* | b* | (%) | After-Before |
| Example 4 | 20.0 | 51.8 | −2.9 | −1.5 | 57.6 | 20.3 | 52.2 | −2.0 | −2.0 | 55.2 | 1.1 |
| Example 5 | 23.8 | 55.9 | 0.4 | −3.0 | 79.4 | 23.9 | 56.0 | −2.0 | −3.8 | 78.7 | 2.5 |
| Reference Example | 20.3 | 52.2 | −1.8 | −2.5 | 99.3 | 17.4 | 48.7 | −0.4 | −2.4 | 99.1 | 3.7 |

As is clearly understood from these examples, in the aromatic polycarbonate polarizing sheet that was dyed by using the dichroic organic dye composition only, the color difference before and after the processing steps was 3.7. In contrast, the aromatic polycarbonate polarizing sheets that were dyed by using the dichroic organic dye composition and the coloration organic dyes composition showed that the color differences before and after the processing steps were 1.1 to 2.5. Thus, the polarizing sheet of the present invention shows small changes in color tone and transmittance before and after the processing steps.

The invention claimed is:

1. A colored low-polarizing film produced by causing, a polyvinyl alcohol film to swell with water, uniaxially stretching it, dyeing it with a dichroic organic dye composition and a coloration organic dye composition, and drying it, wherein the dichroic organic dye composition comprises a combination of dichroic organic dyes having a dichroic ratio of 13 or higher, wherein the coloration organic dye composition comprises a combination of dyes having an extremely low dichroic ratio, of 4 or less, or substantially having no dichroic ratio, wherein the dichroic organic dyes of the dichroic organic dye composition are selected so as to be colorless and contribute to obtain the polarizing degree of interest, wherein the dyes of the coloration organic dye composition are selected so as to have color of interest, wherein because of a low or no dichroic ratio of the coloration organic dye composition, the film shows a small change in color tone during a heating process, and wherein the polarizing degree of the film is 45% to less than 90%.

2. The colored low-polarizing film of claim 1, wherein the dichroic organic dye composition is used in an amount necessary to obtain the lower limit of the required dichroic ratio.

3. The colored low-polarizing film of claim 1, wherein the coloration organic dye composition is used in an amount such that the transmittance of the film is 8% to 50% and is at least 5% less than the transmittance of a polarizing film obtained by using the dichroic organic dye composition only.

4. A method for producing a colored low-polarizing film by causing a polyvinyl alcohol film to swell with water, uniaxially stretching it, dyeing it with a a dichroic organic dye composition and a coloration organic dye composition, and drying it,
   wherein the dichroic organic dye composition comprises a combination of dichroic organic dyes having a dichroic ratio of 13 or higher, wherein the coloration organic dye composition comprises a combination of dyes having an extremely low dichroic ratio of 4 or less or substantially having no dichroic ratio, wherein the dichroic organic dyes of the dichroic organic dye composition are selected so as to be colorless and contribute to obtain the polarizing degree of interest, wherein the dyes of the coloration organic dye composition are selected so as to have color of interest, wherein because of the low or no dichroic ratio of the coloration organic dye composition, the film shows the small change in color tone during a heating process, and
   wherein the polarization degree of the film is 45% to less than 90%.

5. The method for producing the colored low-polarizing film of claim 4, wherein the dichroic organic dye composition and the coloration organic dye composition are used in a separated aqueous solution.

6. The method for producing the colored low-polarizing film of claim 4, wherein the dichroic organic dye composition is used in an amount necessary to obtain the lower limit of the required dichroic ratio.

7. The method for producing the colored low-polarizing film of claim 4, wherein the coloration organic dye composition is used in an amount such that the transmittance of the film is 8% to 50% and is at least 5% less than the transmittance of a polarizing film obtained by using the dichroic organic dye composition only.

8. A colored low-polarizing sheet that comprises a polarizing film produced by causing a polyvinyl alcohol film to swell with water, uniaxially stretching it, dyeing it with a dichroic organic dye composition and a coloration organic dye composition, and drying it, and transparent sheets being attached on both sides of the polarizing film by an adhesive, wherein the dichroic organic dye composition comprises a combination of dichroic organic dyes having a dichroic ratio of 13 or higher, wherein the coloration organic dye composition comprises a combination of dyes having an extremely low dichroic ratio, of 4 or less, or substantially having no dichroic ratio, wherein the dichroic organic dyes of the dichroic organic dye composition are selected so as to be colorless and contribute to obtain the polarizing degree of interest, wherein the dyes of the coloration organic dye composition are selected so as to have color of interest, wherein because of the low or no dichroic ratio of the coloration organic dye composition, the film shows the small change in color tone during a heating process, and wherein the polarizing film is a colored low-polarizing film of a desired color that has a polarizing degree of 45% to less than 90%.

9. The colored low-polarizing sheet of claim 8,
   wherein the dichroic organic dye composition and the coloration organic dye composition are used in a separated aqueous solution.

10. The colored low-polarizing sheet of claim 8,
    wherein the dichroic organic dye composition is used in an amount necessary to obtain the lower limit of the required dichroic ratio.

11. The colored low-polarizing sheet of claim 8,
    wherein the coloration organic dye composition is used in an amount such that the transmittance of the film is 8% to 50% and is at least 5% less than the transmittance of a polarizing film obtained by using the dichroic organic dye composition only.

12. The colored low-polarizing sheet of claim 8,
    wherein the transparent sheets are one or more resins selected from the group consisting of: aromatic polycarbonates, polyacrylates, acetylcelluloses, and a composition of an aromatic polycarbonate and an alicyclic polyester.

13. The colored low-polarizing sheet of claim 8,
    wherein the transparent plastic sheets are an aromatic polycarbonate sheet and the polarizing sheet is from 0.1 mm to 1 mm thick at 3000 nm or higher retardation.

14. The colored low-polarizing sheet of claim 8,
    wherein the adhesive is a two-liquid-type thermosetting polyurethane resin that consists of a curative agent that comprises a polyurethane prepolymer and a hydroxyl (poly) acrylate.

15. A colored low-polarizing lens obtained by:
    (1) laminating a transparent plastic sheet via an adhesive layer to each surface of the colored low-polarizing film of claim 1 to obtain a polarizing sheet,
    (2-1) causing the polarizing sheet to curve so as to impart spherical or aspherical surfaces thereto to obtain a curved polarizing lens, or
    (2-2) causing the polarizing sheet to curve so as to impart spherical or aspherical surfaces thereto and injecting a transparent resin onto the a concave surface to obtain an injection-molded lens,
    wherein the surface of one side of the polarizing sheet is a colored low-polarizing sheet that has 45% to less than 90% of a polarizing degree and that side is curved to make a concave surface.

16. The colored low-polarizing lens of claim 15,
    wherein the dichroic organic dye composition and the coloration organic dye composition are used in a separated aqueous solution.

17. The colored low-polarizing lens of claim 15, wherein the dichroic organic dye composition is used in an amount necessary to obtain the lower limit of a required dichroic ratio.

18. The colored low-polarizing lens of claim 15, wherein the coloration organic dye composition is used in an amount such that a transmittance of the film is 8% to 50% and is at least 5% less than the transmittance of a polarizing film obtained by using the dichroic organic dye composition only.

19. The colored low-polarizing lens of claim 15, wherein the transparent plastic sheet is one or more selected from the group consisting of: aromatic polycarbonates, polyacrylates, acetylcelluloses, and a composition of an aromatic polycarbonate and an alicyclic polyester.

20. The colored low-polarizing lens of claim 15, wherein the transparent plastic sheet is an aromatic polycarbonate sheet and the polarizing sheet is from 0.1 mm to 1 mm thick at 3000 nm or higher retardation.

21. The colored low-polarizing lens of claim 15, wherein the adhesive layer is a two-liquid-type thermosetting polyurethane resin that consists of a curative agent that comprises a polyurethane prepolymer and a hydroxyl (poly) acrylate.

\* \* \* \* \*